Jan. 1, 1929.  1,697,204
J. A. NOMICOS
BUMPER SUPPORTING MECHANISM
Filed Oct. 15, 1927  2 Sheets-Sheet 1
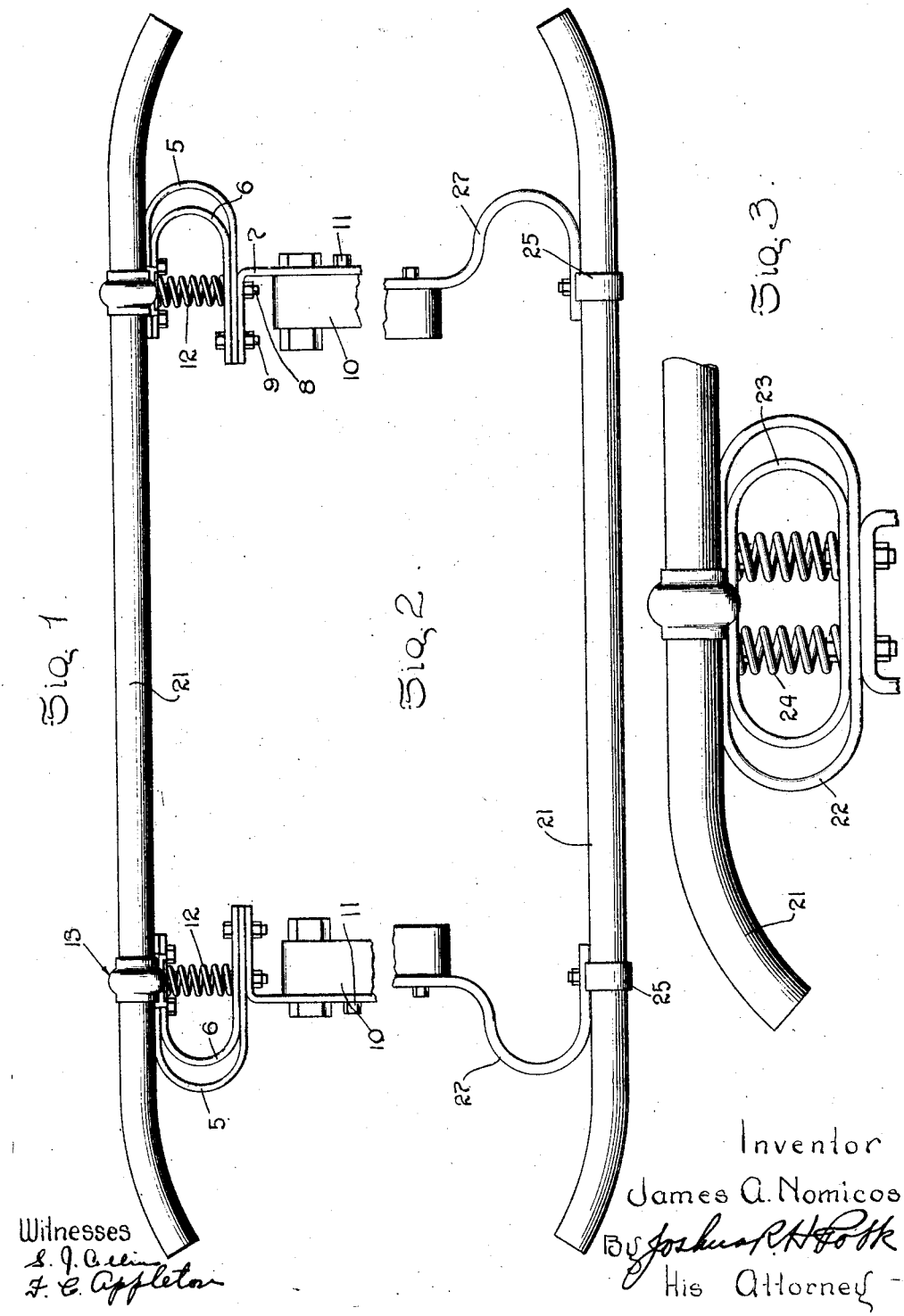
Witnesses
Inventor
James A. Nomicos
His Attorney Jan. 1, 1929.  1,697,204
J. A. NOMICOS
BUMPER SUPPORTING MECHANISM
Filed Oct. 15, 1927  2 Sheets-Sheet 2
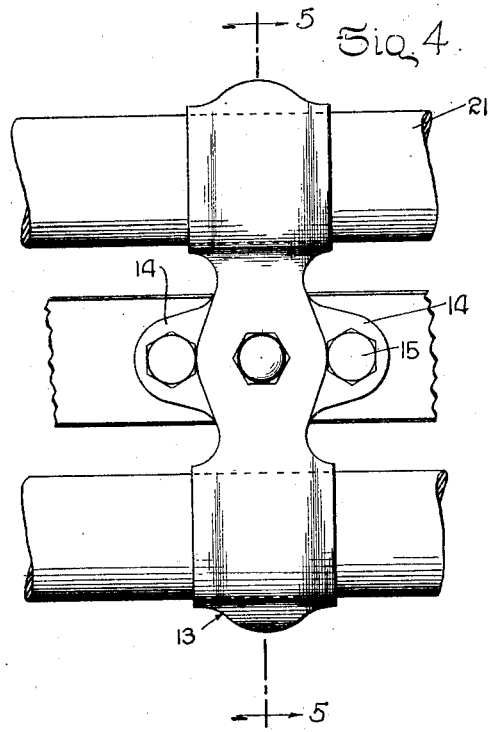
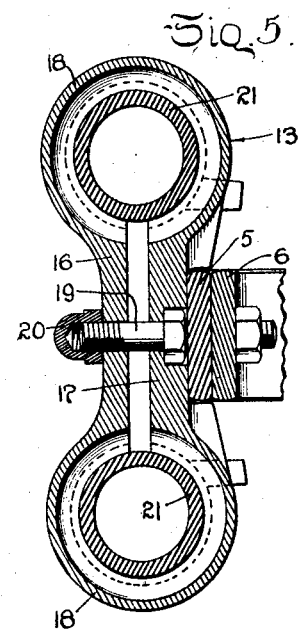
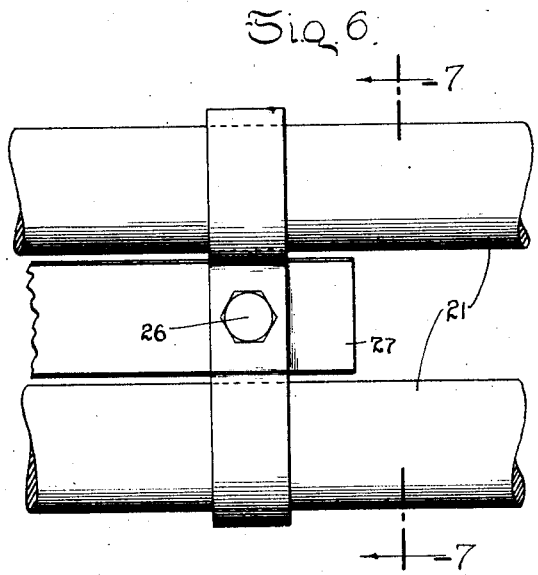
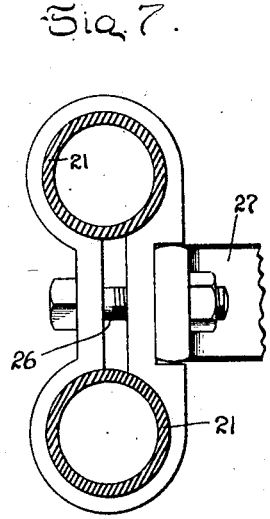
Inventor
James A. Nomicos
By Joshua R H Toth
His Attorney
Witnesses Patented Jan. 1, 1929.

1,697,204

UNITED STATES PATENT OFFICE.

JAMES A. NOMICOS, OF CHICAGO, ILLINOIS.

BUMPER-SUPPORTING MECHANISM.

Application filed October 15, 1927. Serial No. 226,325.

My invention relates to an automobile bumper supporting mechanism, and the object of my invention is to provide such a device that is relatively rugged of construction and at the same time being sufficiently flexible to give the desired yield when the bumper is engaged by a relatively heavy object without danger of bending the bumper or the frame of the automobile.

Another object of my invention is to provide a novel clamping mechanism for securing a plurality of bars in position.

In the accompanying drawings,

Figure 1 is a plan view of a bumper and the supporting mechanism therefor.

Figure 2 is a plan view of my invention.

Figure 3 is a plan view of a modified form of a bumper supporting mechanism.

Figure 4 is an enlarged elevational view of the clamping mechanism shown in connection with the supporting mechanism in Figure 6.

Figure 5 is a sectional view taken on the line 5—5 of Figure 4.

Figure 6 is an enlarged rear elevational view of a modified form of clamp used in my invention as disclosed in Figure 2.

Figure 7 is a sectional view taken on the line 7—7 of Figure 6.

In the accompanying drawings, I have disclosed the preferred form of my invention, which consists of a supporting device made up of a plurality of the springs 5 and 6, which are substantially oval around one end and are spaced apart as shown in Figure 1. The spring 6 is positioned within the spring 5 and said springs engage each other at oppositely disposed portions, and at said engaging points the leaf springs are secured together and to a supporting member 7 by means of suitable bolts 8 and 9. The member 7 is secured to the chassis frame 10 by means of bolt 11.

Interposed between the oppositely disposed portions of the springs 5 and 6 is a coil spring 12.

Positioned on the forward side of said leaf springs is a bumper clamp 13. Said clamp is provided with laterally extending lugs 14 through which bolts 15 are provided for securing said clamp 13 to the springs 5 and 6. The clamp 13 is of unitary construction and consists of parallel portions 16 and 17 which are provided with cylindrical portions 18 on each end thereof. A bolt 19 passes through the portions 16 and 17 and has its head countersunk in the body of the portion 17 for preventing the bolt from rotating. A nut 20 is provided on the forward end of bolt 19 for the purpose of adjusting the distance between said parallel portions and thereby clamping or unclamping the bumper bars 21 which pass through the split cylindrical members 18, as best shown in Figure 5.

In Figure 3 is disclosed a modification which consists of leaf spring members 22 and 23 which are similar to springs 5 and 6, with the exception that they are complete ovals, as shown, and within the concentrically arranged springs 22 and 23 are interposed a plurality of coil springs 24 in like manner to that disclosed in Figure 1.

Figure 2 discloses a modified form of clamp 25 which is similar to the clamp shown in Figure 8, but is simpler of construction and is provided with a single through bolt 26 for clamping the bumper bars 21 in position and at the same time securing the clamp to the supporting member 27 as best shown in Figures 6 and 7.

It will be understood that my invention is capable of many variations without departing from the spirit of the invention and while I have described the same in its preferred form, I do not wish to be limited to the precise details of construction herein set forth, but desire to avail myself of such variations and modifications as come within the scope of the appended claims.

I claim as my invention:

1. A device of the class described, comprising a plurality of leaf springs; oppositely disposed portions of said springs engaging and being secured to each other; intermediate portions of said springs being spaced apart; means for securing said springs to a chassis frame; means on said springs for supporting a bumper.

2. A device of the class described, comprising a plurality of leaf springs; oppositely disposed portions of said springs engaging and being secured to each other; intermediate portions of said springs being spaced apart; means for securing said springs to a chassis frame; means on said springs for supporting a bumper; resilient means interposed between the engaging portions of said springs.

3. A device of the class described, comprising a plurality of leaf springs; oppositely disposed portions of said springs engaging and being secured to each other; intermediate portions of said springs being spaced apart;

means for securing said springs to a chassis frame; means on said springs for supporting a bumper; a coil spring interposed between the engaging portions of said leaf springs.

4. A device of the class described, comprising a plurality of oval shaped leaf springs concentrically arranged; the end portions of said ovals being spaced apart; the side portions of said ovals engaging and being secured to each other; a plurality of resilient members interposed between the engaging portions of said leaf springs; means for securing said springs to a chassis frame and means on said springs for supporting a bumper.

5. A bumper support comprising vertically arranged spaced, parallel portions; a hollow cylindrical clamping member on each end thereof and integral with said parallel portions; means for adjusting the distance between said parallel portions; means for securing said support in spaced relation to a chassis frame.

6. A bumper support comprising vertically arranged, spaced, parallel portions; a hollow cylindrical clamping member on each end thereof, and integral with said portions; a bolt for adjusting the distance between said parallel portions; laterally extending lugs on one of said parallel portions; bolts passing through said lugs for securing said support in spaced relation to a chassis frame.

In testimony whereof I have signed my name to this specification.

JAMES A. NOMICOS.